(12) United States Patent
Beitzel et al.

(10) Patent No.: US 6,279,594 B1
(45) Date of Patent: Aug. 28, 2001

(54) FLOW ACTUATED VALVE

(75) Inventors: Donald D. Beitzel, Grantsville; Robert Yaste, Accident, both of MD (US)

(73) Assignee: Beitzel Corporation, Springs, PA (US)

( * ) Notice: Subject to any disclaimer, the term of this patent is extended or adjusted under 35 U.S.C. 154(b) by 0 days.

(21) Appl. No.: 09/500,677

(22) Filed: Feb. 9, 2000

(51) Int. Cl.[7] .................................................. F16K 31/42
(52) U.S. Cl. .............................. 137/1; 137/107; 137/219; 137/220; 137/301
(58) Field of Search ............................... 137/1, 107, 219, 137/220, 301

(56) References Cited

U.S. PATENT DOCUMENTS

| | | |
|---|---|---|
| 385,521 | 7/1888 | Park . |
| 1,021,537 | * 3/1912 | Lawnin ............................. 137/301 X |
| 1,297,001 | * 3/1919 | O'Shields ........................ 137/302 X |
| 2,976,880 | 3/1961 | Cassarino et al. . |
| 3,114,532 | 12/1963 | Gray et al. . |
| 3,131,722 | * 5/1964 | Abbott et al. ...................... 137/625.6 |
| 3,727,630 | 4/1973 | McInnis . |
| 3,980,270 | 9/1976 | Thomas . |
| 4,285,493 | 8/1981 | Willis . |
| 4,285,495 | 8/1981 | King . |
| 4,589,627 | 5/1986 | Grotloh . |
| 4,909,270 | * 3/1990 | Enterante et al. ................... 137/107 |

FOREIGN PATENT DOCUMENTS 2065929   7/1981   (GB) .

* cited by examiner

Primary Examiner—Gerald A. Michalsky
(74) Attorney, Agent, or Firm—Price & Adams

(57) ABSTRACT

An upright cylindrical valve body has an inlet port axially aligned with an outlet port. A valve member is retained for reciprocal movement into and out of engagement with a valve seat axial aligned with fluid flow between the inlet and outlet ports. A relief port positioned adjacent to the outlet port exhausts fluid that remains in the valve above the valve seat after it is closed. The valve member is normally maintained in a closed position. Fluid flow into the inlet port actuates the valve. A portion of the fluid flowing through the valve chamber is diverted through passageways by a pair of remote controlled solenoid valves to open the valve. When it is desired to close the valve, the solenoid valves are actuated to evacuate fluid internally within the valve so that the valve member is returned to a closed position. A relief valve in the outlet port exhausts fluid from the upper end of the valve when the fluid pressure falls below a preselected magnitude. Flow through the valve is incrementally controlled by pulsing or cycling movement of the valve member into and out of engagement with the valve seat by switching the solenoid valves between on and off positions. In the closed position of the valve, all fluid is automatically exhausted from the valve.

20 Claims, 5 Drawing Sheets

FLOW ACTUATED VALVE

BACKGROUND OF THE INVENTION

1. Field Of the Invention

This invention relates to method and apparatus for actuating a normally closed valve by fluid flow to the inlet port of the valve, and, more particularly, to a hydrant-type valve that is opened when fluid pressure is applied to the inlet port of the valve and is closed when fluid flow to the inlet port is terminated.

2. Description of the Prior Art

Pressure medium actuated valves, also known as flow control valves, effect an opening or closing of a valve in response to pressurized flow to the inlet of the valve. A pressure medium activated valve is distinguished from a valve which is manually or automatically closed or opened upon demand. With a conventional valve an external force, other than fluid flow with the valve, is required to operate the valve between the open and closed positions. However, as disclosed in U.S. Pat. No. 4,285,495, emergency conditions may arise where the externally applied operating force may be impaired requiring that means be provided for immediately closing the fluid line without depending upon the availability of an externally supplied motivating force.

U.S. Pat. No. 4,285,495 discloses a safety valve which is normally closed, and in the absence of an externally supplied motivating force remains closed, or, if opened, immediately moves to the closed position. To open the valve, a positive fluid pressure must be supplied to the valve. The valve remains open as long as the externally supplied fluid pressure is available. In the event of an emergency, such as explosion, fire or the like, the externally supplied fluid may be removed by automatic means. The removal of the externally supplied pressure causes the valve to close. In the present application the valve is fail safe and is closed at all times except in the presence of a positively supplied actuating fluid pressure signal to open the valve.

In the operation of the above described safety valve, the fluid pressure required to open the valve is introduced externally of the valve. The biasing force of a spring that maintains the valve member in sealing engagement with the valve seat is overcome. The fluid flow into the inlet of the valve does not open the valve. A separate inlet through the valve body into the valve chamber is required. In other words, an external pressure signal separate from the inlet flow to the valve is required to open the valve. In the event the pressure signal fails, the valve automatically closes.

Conventionally, pressure medium actuated valves include a valve member or piston movable between an operative position corresponding to an open valve and a safety position corresponding to a closed valve. A spring is generally used to bias the piston toward the safety position. Operation of the valve to the safety position requires external pressure lines which connect a pressure chamber with subchambers divided by the piston. The piston is retained in the operative position by flow of a pressurized medium to the valve. To close the valve, the piston is moved to the safety position via the connecting line between the pressure chamber and the piston chamber.

U.S. Pat. No. 4,589,627 discloses a pressure medium actuated valve having a valve chamber, an inlet for conveying a pressure medium to the chamber, an outlet for conveying pressure medium from the chamber, and a cylinder sealingly spaced from the chamber. A piston is reciprocally positioned in the cylinder to divide the cylinder into a first chamber which enlarges upon movement of the piston from an operative position to a safety position and a second chamber which decreases upon the piston movement. A spring normally biases the piston toward the safety position. The flow of pressurized medium to the respective piston chambers is supplied through relief lines having control valves. The same pressure medium supplied to the inlet is supplied to external control lines operated by valves. While the pressure medium to the inlet of the valve controls the operation of the valve, external lines are connected to the valve body, increasing the overall complexity of the valve construction.

An early version of the above described control valves is disclosed in U.S. Pat. No. 385,521. A spring biased valve member is normally maintained in the closed position as long as the chamber connected to the inlet receives a pressurized flow which when combined with the spring force maintains the valve member seated or in a closed position. In the absence of fluid flow into the inlet, the valve member is maintained seated in the closed position by the spring force. When the fluid flow is supplied to the chamber below the piston equal to the pressure in the chamber above the piston, the valve member is displaced from the valve seat to open the valve and allow passage of fluid from the inlet to the outlet of the chamber. In a second embodiment, equalization of the fluid pressure above and below the piston is accomplished by the provision of an electrically controlled valve for supplying pressure below the piston. In both embodiments an external connection is required for supplying the needed pressure medium in addition to the inlet flow to the valve to open the valve.

The opening and closing of a spring biased valve disclosed in U.S. Pat. No. 3,980,270 is controlled by a solenoid operated pilot valve built into the valve body. The inlet to the valve is axially aligned with a valve member positioned on a valve seat between the inlet port and an outlet port extending at right angles to the valve chamber above the valve seat. The valve member is normally maintained by spring bias on the valve seat. The pilot valve closure member extends transversely or across the inlet port to engage in the normally closed position a valve seat leading to a relief channel. Actuation of the electric solenoid displaces the pilot valve member from the valve seat. This diverts fluid from the inlet port into a chamber which applies a force against the opposing spring bias to move the valve member off of the valve seat and open the valve for flow to the valve outlet.

A hydrant-type valve used in a water sprinkler supply line is disclosed in U.S. Pat. No. 3,727,630. Two embodiments of a control valve are shown for supplying water through a pipe to sprinklers. The valve includes an upright cylindrical structure having an inlet port positioned below an outlet port which extends transverse to flow into the inlet port. In one embodiment, the valve is opened and closed by a manual rotation of the valve stem to move a stopper into and out of sealing engagement with the valve seat. In another embodiment, flow through the inlet port is directed to an axial passageway to urge the valve member to a closed position. The axial flow to the valve stem is directed internally in the valve body through an internal passageway maintained closed by a stopper which is actuated by a solenoid. Energizing the solenoid from an external electrical supply displaces the control stopper to permit flow through the valve to apply a force upon the valve stem. The valve member is displaced from the valve seat so that water passes into the pipe leading to the sprinklers. When the solenoid is deenergized, the control stopper moves to the closed position, displacing the liquid pressure acting on the valve stem so that the fluid flow into the valve forces the valve member against the valve seat to close the valve.

Other examples of solenoid operated valves for actuating a control valve are disclosed in U.S. Pat. Nos. 3,114,532 and 4,285,493 and published UK Patent Application 2,065,929 A. An example of a flow control valve which permits symmetrical or generally straight line flow through a valve body or housing is disclosed in U.S. Pat. No. 2,976,880.

Pressure medium actuated valves are known to control the movement of a valve member into and out of an operative position relative to a valve seat by the pressure of the medium flowing through the valve. With the known devices an externally supplied actuating pressure signal is required to move a valve member to an open or closed position. The actuating signal may be provided by an electric solenoid which controls the valve for directing a portion of the fluid into the valve to displace the valve member from the valve seat. The conventional devices require complex fittings applied externally to the valve housing. The same complexity in the construction of the valve is encountered when manual means is utilized to actuate the valve.

In many applications there is a demand for a hydrant-type arrangement in which a straight line or axial flow to the valve body is desired so that the inlet and outlet ports are axially aligned and not transversely displaced. This is required in applications where the valve must be exhausted of all fluid when it is closed to prevent retention of fluid in the valve. This becomes a problem when the inlet and outlet are not axially aligned in an upright position.

Therefore, there is need for a pressure medium actuated valve responsive to inlet flow to the valve to move the valve member between operative positions in a straight line path of the fluid flow without the requirement for external connections to the valve housing to actuate movement of the valve member.

SUMMARY OF THE INVENTION

In accordance with the present invention there is provided a flow actuated valve that includes a valve body having an inlet end portion with an inlet port and an outlet end portion with an outlet port. The inlet port is axially aligned with the outlet port. A fluid chamber in the valve body forms a flow path for conveying fluid from the inlet port to the outlet port. A relief port extends through the valve body into the valve chamber adjacent to the outlet port. A valve seat is positioned in the fluid chamber in axial alignment with the inlet and outlet ports. The valve seat is located in the fluid chamber between the inlet port and the relief port. A valve member is positioned in the fluid chamber for movement into and out of sealing engagement with the valve seat to control the flow of fluid between the inlet and outlet ports. A valve piston is positioned axially in the valve body in spaced relation to the valve member. A valve stem is connected at one end to the valve member and at an opposite end to the valve piston. A spring is retained in the valve body to exert an axial biasing force upon the valve piston to normally maintain the valve member in a closed position sealingly engaging the valve seat to obstruct flow from the inlet port to the outlet port. A passageway extends internally through the valve body for diverting a portion of the fluid flow into the inlet port from the fluid chamber into contact with the valve piston to overcome the biasing force of the spring to displace the valve piston and move the valve member to an open position to allow fluid flow through the valve chamber from the inlet port to the outlet port. The valve member is moved to the open position in response to fluid flow into the inlet port. The valve member automatically moves to the closed position under the force of the spring upon termination of fluid flow into the inlet port with the fluid remaining in the fluid chamber between the valve member and the inlet end portion exhausted through the inlet port and the fluid remaining in the fluid chamber between the valve member and the outlet end portion exhausted through the relief port whereby all fluid in the fluid chamber is exhausted upon closure of the valve member.

Further in accordance with the present invention there is provided a hydrant valve that includes a cylindrical body portion positioned upright to define a vertical flow path through a valve chamber between an inlet port and an outlet port and aligned with the longitudinal axis of said body portion. A valve seat is formed by the body portion in the flow path positioned adjacent to and axially aligned with the outlet port. A valve member is axially positioned in the flow path. Actuator means in the body portion moves the valve member between a closed position sealingly engaging the valve seat and an open position removed from the valve seat for conveying fluid under pressure from the inlet port to the outlet port. The valve member is movable to the open position in response to axial flow into the inlet port and movable to the closed position in response to termination of flow to the inlet port. The valve member in the closed position diverts fluid in the fluid chamber on one side of the valve member out the inlet port and the fluid chamber on an opposite side of the valve member out the relief port to exhaust all fluid from the fluid chamber upon closure of the valve member.

Additionally, the present invention is directed to a method for actuating a valve by fluid flow into the valve that includes the steps of directing fluid under pressure in a flow path axially through a body portion from an inlet port to an outlet port. A valve member is positioned in the valve body for axial reciprocal movement in the flow path into and out of sealing engagement with the valve seat. The valve member is normally biased in sealing engagement with the valve seat in the absence of fluid flow to the inlet port to maintain the valve closed. The valve member is actuated to move to an open position on the valve seat in response to fluid flow to the inlet port. A portion of the fluid within the valve body is diverted from the fluid path to oppose the normal bias on the valve member and move the valve member out of sealing engagement with the valve seat to open the valve for fluid flow to the outlet port. The valve member is returned to sealing engagement with the valve seat upon an interruption in the fluid flow to the inlet port to close the valve. All fluid in the flow path is exhausted from the valve body upon closure of the valve member by directing the fluid on one side of the valve seat out the inlet port and the fluid on an opposite side of the valve seat out a relief port.

Accordingly, a principal object of the present invention is to provide method and apparatus for actuating a valve between open and closed positions by pressurized flow into the inlet of the valve and upon termination of flow to the valve all fluid is exhausted from the valve.

Another object of the present invention is to provide a hydrant valve for directing fluid flow in a vertical path from an inlet to an outlet where the valve is opened in response to flow into the valve and the valve is closed upon interruption of flow and all fluid remaining in the valve is exhausted.

An additional object of the present invention is to provide a flow actuated valve having internal means responsive to flow into the valve to reciprocate a valve closure member between open and closed positions to limit the amount of fluid directed through the valve.

A further object of the present invention is to provide a fluid actuated valve operable between fully open and fully closed positions with intermittent positioning of the valve member to provide proportional flow where interruption of flow to the valve closes the valve and any fluid remaining in the valve is exhausted so that in the closed position no fluid is retained in the valve.

These and other objects of the present invention will be more completely disclosed and described in the following specification, the accompanying drawings, and the appended claims.

DESCRIPTION OF THE PREFERRED EMBODIMENTS

Figure 1:
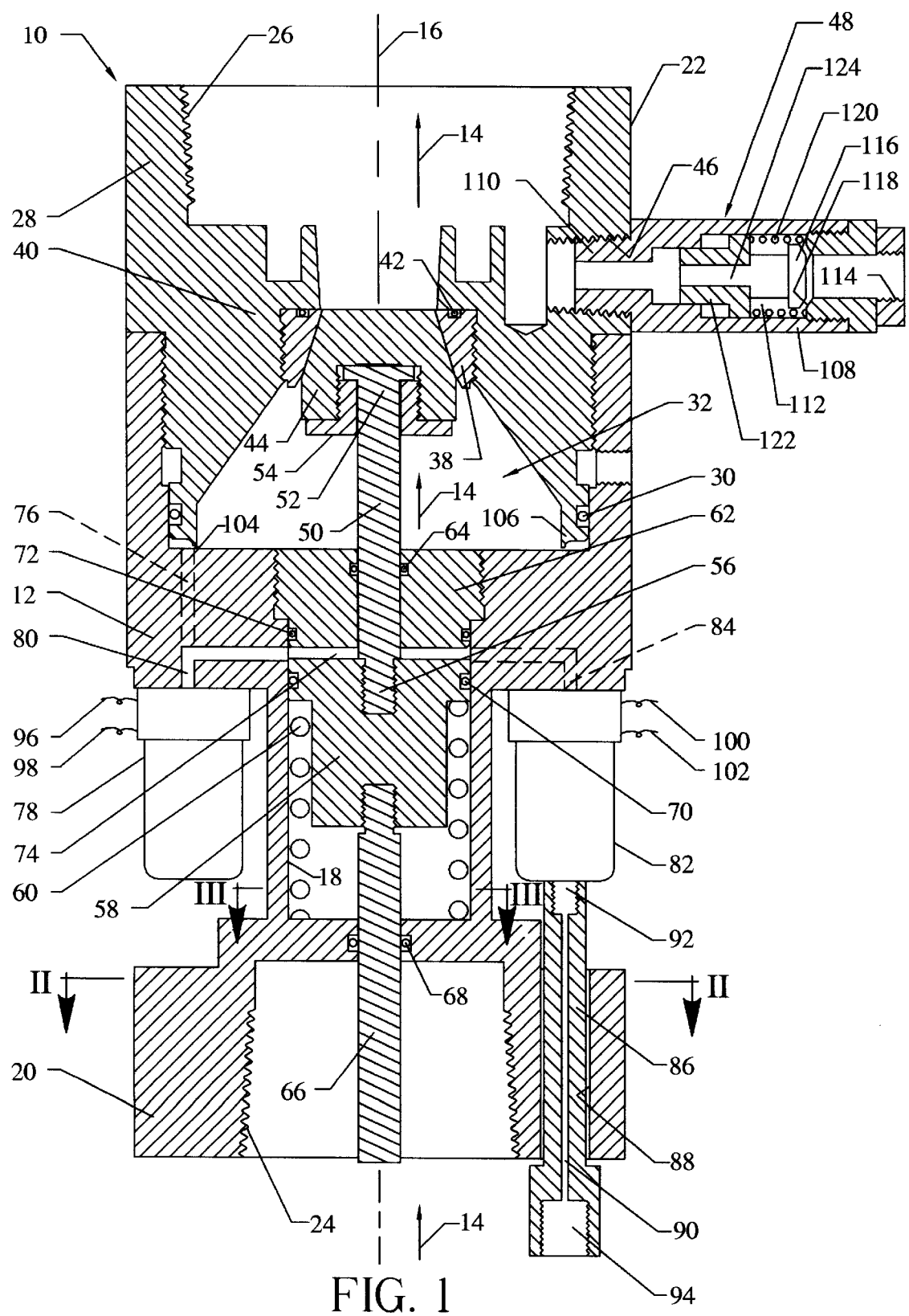
FIG. 1 is a sectional view in side elevation of a flow actuated valve, illustrating the valve in a closed position and having inlet and outlet ports axially aligned in an upright position.

Referring to the drawings and, particularly to FIGS. 1–4, there is illustrated a flow actuated valve generally designated by the numeral 10 of the hydrant-type having an upright cylindrical body portion 12 defining a vertical flow path 14. The flow path 14 is coaxial with a longitudinal axis 16 of the body portion 12. The valve body portion 12 includes a cylindrical bore 18 that extends completely through the body portion 12 between an inlet end portion 20 and an outlet end portion 22. The end portion 20 includes an inlet port 24, and the end portion 22 includes an outlet port 26. The inlet and outlet ports 24 and 26 are coaxially aligned with the longitudinal axis 16.

Both the inlet and outlet ports 24 and 26 are internally threaded for connection to a selected conduit system for conveying pressurized fluid through the valve 10. In one example, the valve 10 is used in a snowmaking system where water under pressure is supplied through a conduit system connected to the inlet port 24 and a conduit system connected to the outlet port 26. Water under pressure is conveyed through the valve 10 to a system of snow guns for generating artificial snow sprayed onto a ski slope.

Figure 5:
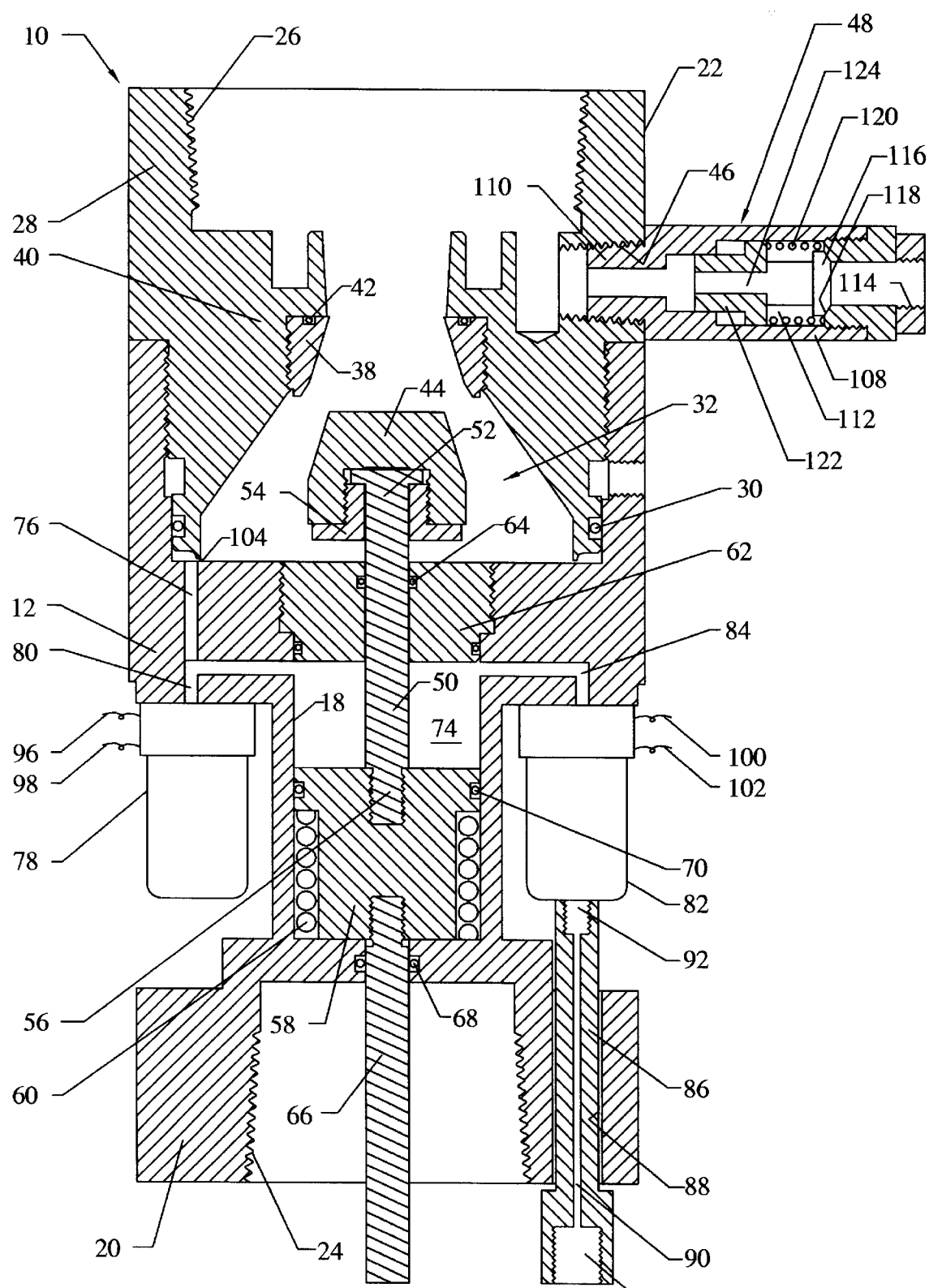
FIG. 5 is a sectional view corresponding to FIG. 1, illustrating the valve in an open position.

In a snowmaking operation, the valve 10 is particularly useful because it is actuated upon pressurized flow supplied to the inlet port 24 to actuate the valve from a closed position, shown in FIG. 1, to an open position, shown in FIG. 5. Accordingly, in the absence of pressurized flow to the inlet port 24, the valve 10 closes to the position illustrated in FIG. 1. As a hydrant-type valve, any fluid remaining within the valve body portion 12 is exhausted from the valve upon closure. This prevents the valve from "freezing up" when used in snowmaking operations after the valve is closed. It should be understood that the valve 10 of the present invention has other applications, as will be described hereinafter in greater detail.

In one embodiment as shown in FIG. 1, the valve body portion 12 is a unitary cylindrical unit. The body portion 12 is threadedly connected to a valve top 28 which forms the valve outlet end portion 22. A two component system constructed from the body portions 12 and 28 facilitate assembly and disassembly of the valve 10 for installation and maintenance. In the two component system, an o-ring seal 30 is positioned between the body portion 12 and the valve top 28.

A fluid chamber or cavity generally designated by the numeral 32 is formed in the body portion 12 around the cylindrical bore 18 and is coaxial therewith. The fluid chamber or cavity 32 extends from the inlet port 24 to the outlet port 26 in surrounding relation with the bore 18. The flow path 14 extends through the fluid chamber 32 around the bore 18. Fluid does not flow from the inlet port 24 into the bore 18.

Figure 2:
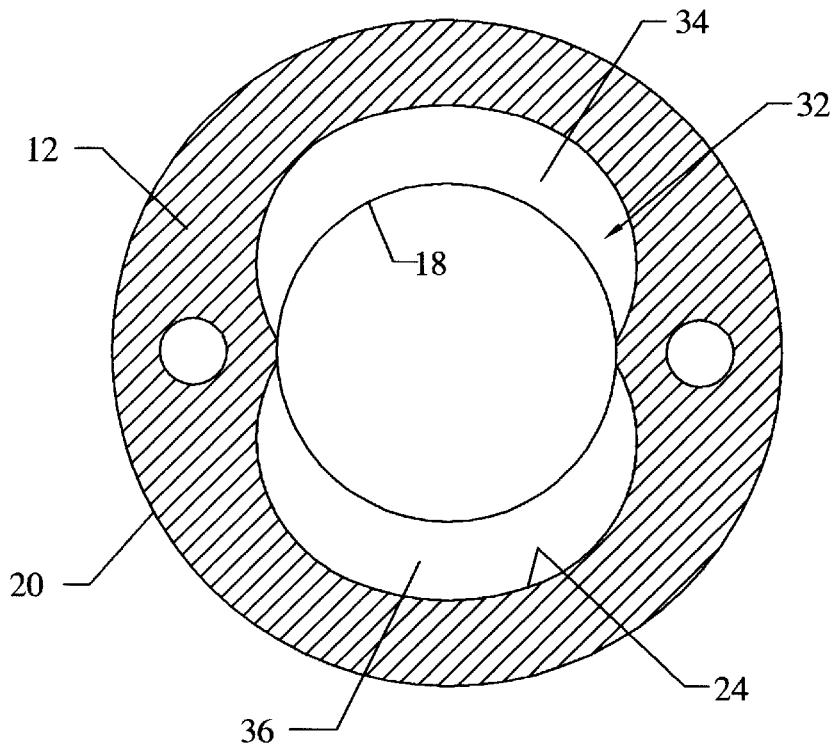
FIG. 2 is a sectional view of the valve body taken along line II—II in FIG. 1, illustrating a two-part fluid chamber having an elliptical configuration extending axially through the body of the valve.
Figure 3:
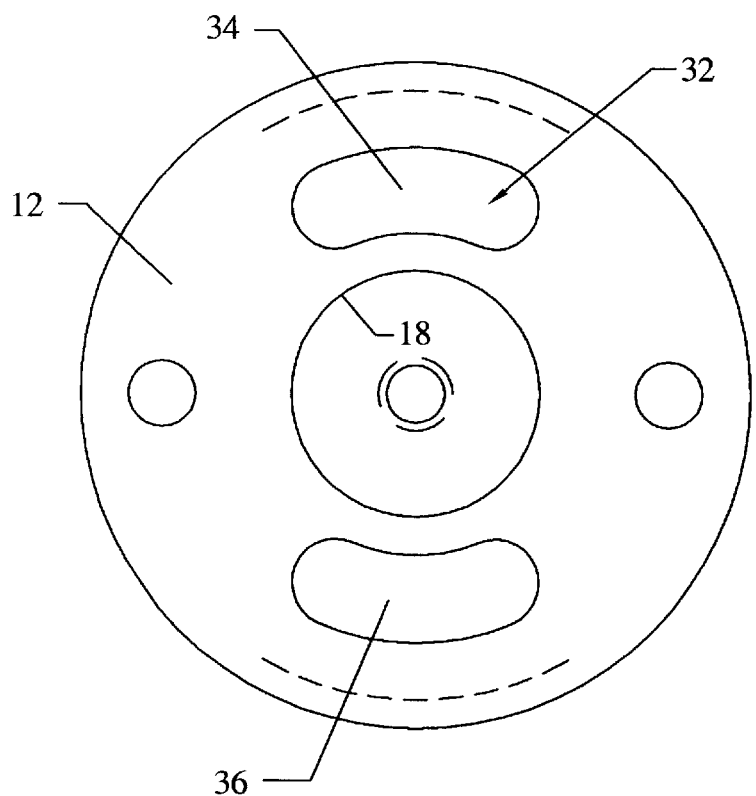
FIG. 3 is a sectional view of the valve body taken along line III—III in FIG. 1, illustrating the elliptically shaped fluid chambers extending axially through the valve body.
Figure 4:
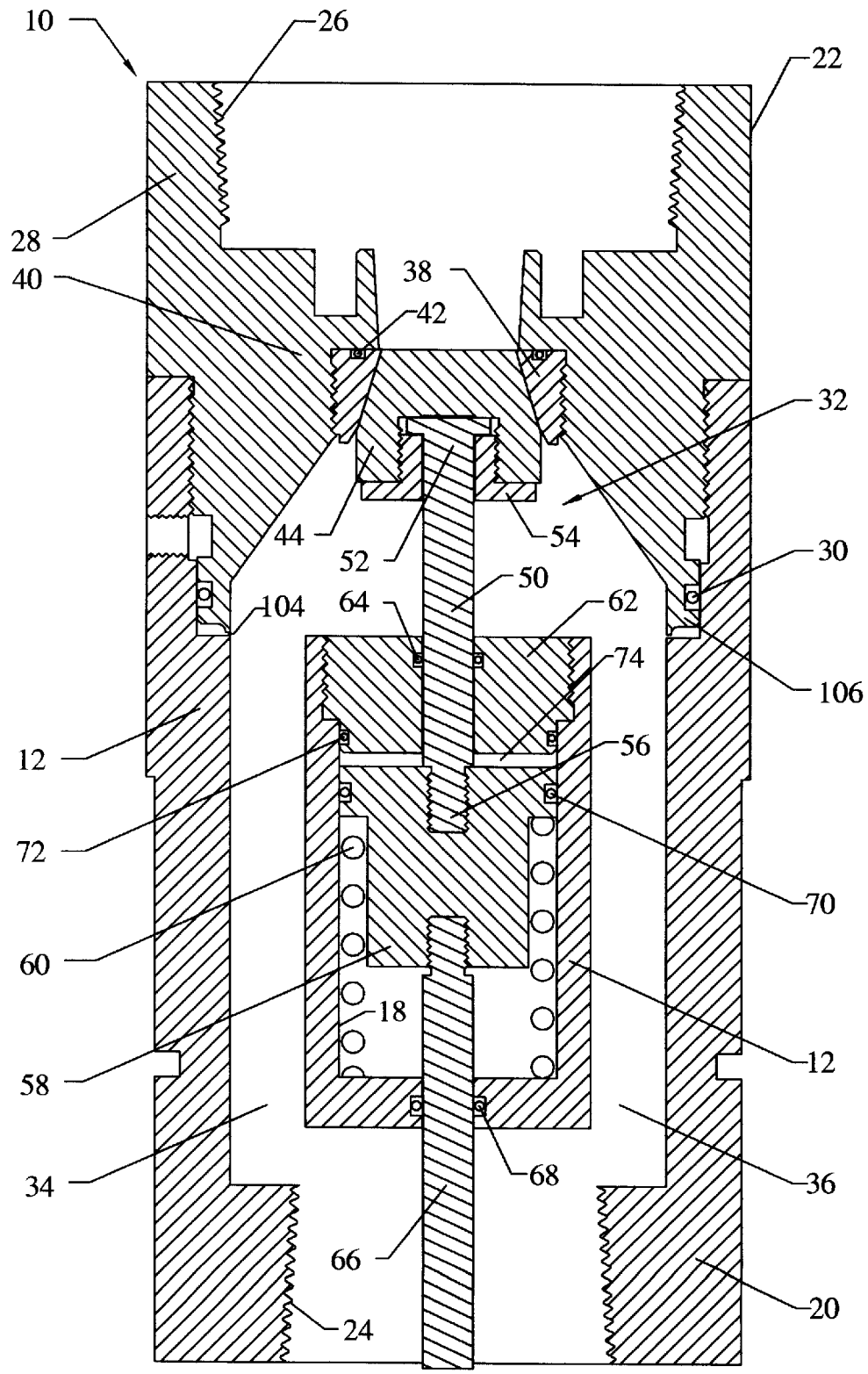
FIG. 4 is a sectional view of the valve in a closed position taken 90° from the section shown in FIG. 1.

The relationship between the cylindrical bore 18 and the fluid chamber 32 is shown in greater detail in FIGS. 2–4. As seen in FIG. 2, the fluid chamber 32 has an elliptical configuration at the inlet port 24 and extends upwardly in surrounding relation with the cylindrical bore 18. Above the inlet end portion 20 the fluid chamber 32, as seen in FIG. 3, is partitioned into a pair of fluid channels 34 and 36 positioned diametrically oppositely of one another and spaced radially an equal distance from the longitudinal axis 16. Accordingly, the flow path 14 through the channels 34 and 36 is aligned with the longitudinal axis 16. In the outlet end portion 22, the channels 34 and 36 converge to form the outlet port 26.

A valve seat 38 is formed in the outlet end portion 22 adjacent to the outlet port 26. The valve seat 38 is formed by a nut externally threaded to an interior sidewall 40 of valve top 28. The sidewall 40 extends into the fluid chamber 32 to provide a constricted opening for the valve seat 38. An o-ring seal 42 seals the threaded connection of the valve seat 38 to the valve top 28.

The interior surface of the valve seat 38 has a conical configuration for receiving in sealing engagement a valve member or plunger 44. Positioned above or downstream of the valve member 44 in outlet end portion 22 is a relief port 46 that extends through sidewall 40 transverse to the flow path 14. The relief port 46 is internally threaded to receive a relief or check valve generally designated by the numeral 48 to normally seal the port 46 when the valve 10 is in the open position, as shown in FIG. 5.

The relief valve 48 is pressure actuated so that when the outlet port 26 is pressurized the valve 48 is closed. When the fluid pressure in the outlet port 26 falls below a preselected magnitude, the relief valve 48 opens to evacuate fluid remaining in the fluid chamber 32 within the outlet end portion 22.

With the above described arrangement, the valve seat 38 is positioned in the fluid chamber 32 in axial alignment with the inlet and outlet ports 24 and 26. As shown in FIGS. 1 and 5, the valve member 44 is movable vertically between the inlet port 24 and the relief port 46 upstream of the outlet port 26. In this configuration the valve 10 operates as a hydrant valve.

The valve member 44 is supported in the fluid chamber 32 for reciprocal movement into and out of sealing engagement with the valve seat 38 by a valve stem or rod 50. The valve stem 50 has an upper end portion 52 that extends into a cup shaped end of the valve member 44 and is retained therein by a valve nut 54 threaded into the valve member 44 in surrounding relation with the valve stem upper end portion 52. A lower end portion 56 of valve stem 50 is threadedly connected to a piston 58 which is supported for vertical reciprocal movement within the cylindrical bore 18 by a spring 60.

Above the piston 58, the valve stem lower end portion 56 extends through a cylinder cap 62 that is threadedly engaged to the interior sidewall of the valve body portion 12. An o-ring 64 is retained by the cylinder cap 62 in surrounding sealing engagement with the valve stem 50. With this arrangement the cylinder cap 62 is axially fixed within the valve body portion 12 to support vertical reciprocal movement of the valve member 44 and valve stem 50 connected to the piston 58. The piston 58 also moves vertically within the cylindrical bore 18 relative to the fixed cylinder cap 62.

To maintain movement of the piston 58 in the valve bore 18 concentric with the longitudinal axis 16, a rod 66 is threadedly connected at one end to the piston 58 and extends axially through the body portion 12 into the inlet port 24. An o-ring 68 retained in the valve body inlet end portion 20 sealingly supports axial movement of the rod 66 in the inlet port 24 as the piston 58, valve stem 50 and valve member 44 move axially in the body portion 12 in the operations of opening and closing the valve. The compression spring 60 is captured in the cylindrical bore 18 between the fixed body portion 12 and an enlarged shoulder of the piston 58. The upper end of the spring 60 is positioned in an annulus formed between the body portion 12 and the end of the piston 58 in bore 18.

The position of the piston 58 on the valve stem lower end portion 56 is fixed. An o-ring 70 surrounds the upper end portion 52 of the piston 58 within the bore 18. The cylinder cap 62 is spaced from and positioned oppositely of the piston 58 on the stem lower end portion 56. The valve stem 50 is movable through an axial bore in the cylinder cap 62. The cap 62 is fixed relative to the valve body portion 12. An o-ring 72 is positioned between the cap 62 and the interior sidewall of the valve body portion 12. With this arrangement the cap 62 is spaced from the piston 58 at all times in the range of movement of the valve stem 50.

In the normally closed position of the valve 10 illustrated in FIG. 1, the compression spring 60 exerts an upward or axial force upon the shoulder of the piston 58. This moves the valve stem 50 and valve member 44 to the closed position on the valve seat 38. Consequently, fluid flow through the valve 10 between the inlet port 24 and the outlet port 26 is interrupted.

The movable piston 58 connected to the valve stem lower end portion 56 is maintained in spaced axial relation with the cylinder cap 62. A fluid cavity 74 is formed between the opposing surfaces of the piston 58 and the cap 62 in the bore 18. The fluid cavity 74 is connected by passageways through the body portion 12 to the fluid chamber 32 which is open to the inlet and outlet ports 24 and 26.

Figure 6:
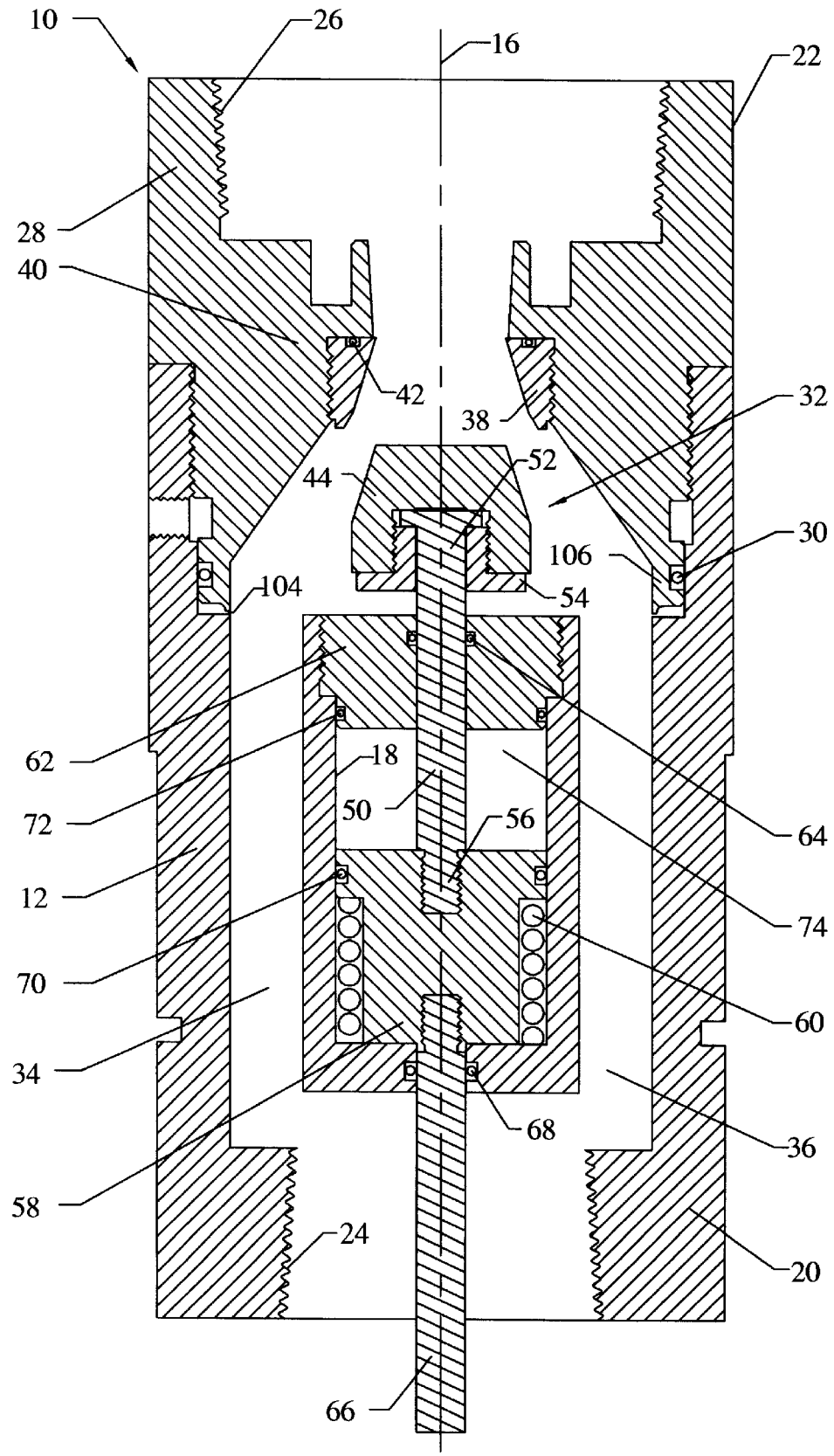
FIG. 6 is a sectional view of the valve taken 90° from the section shown in FIG. 1, illustrating the valve in an open position.

As seen in FIG. 1 when the valve 10 is in the closed position, the fluid cavity 74 has a minimal volume. The volume of the cavity 74 expands, as shown in FIGS. 5 and 6, when the valve is moved to the open position. The flow of fluid into and out of the cavity 74 controls the movement of the piston 58 against the biasing force of the spring 60. Accordingly, when fluid is supplied to the cavity 74 to overcome the force of the spring 60, the piston 58 is moved downwardly within the bore 18 to the position shown in FIGS. 5 and 6. This moves the valve member 44 out of sealing engagement with the valve seat 38 to permit fluid to flow to the outlet port 26.

The fluid chamber 32 in the valve body portion 12 is connected through internal passageways in the body portion 12 to the fluid cavity 74. A first channel 76 extends from chamber 32 through the valve body portion 12 and communicates with a fluid inlet of a solenoid operated valve 78. The valve 78 is secured to the valve body 12 and includes a fluid outlet connected to a passageway 80. The passageway 80 extends through the valve body portion 12 into communication with the fluid cavity 74 that separates the piston 58 from the cylinder cap 62.

A second solenoid operated valve 82 is connected to the opposite side of valve body portion 12. A passageway 84 extends from communication with the fluid cavity 74 through the valve body portion 12 to an inlet of the solenoid valve 82. As shown in FIG. 1, solenoid valve 82 includes an outlet connected to a drain pipe 86 that extends through a bore 88 in the valve body inlet end portion 20. An axial channel 90 extends through the drain pipe 86 to an end portion 94 adapted for connection to a conventional conduit system that drains fluid from valve 10.

As illustrated in FIGS. 1 and 4, the valve 10 is in the closed position when the valve member 44 is sealingly engaged in contact with the valve seat 38 to prevent pressurized fluid flow from the inlet port 24 upwardly to the outlet port 26. The valve is actuated to move from the closed position to the open position, illustrated in FIGS. 4 and 5, by introducing flow of pressurized fluid into the inlet port 24.

It should be understood that the valve 10 of the present application has applications in a variety of uses. One use is the control of the flow of water to a snowmaking system. Another use is controlling the flow of fluid in chemical processes, as encountered in paper mills and chlorination systems where additives must be supplied to water in a controlled manner.

In accordance with the present invention, the valve 10 is actuated by the flow of a pressurized medium to the inlet port 24. From the inlet 24 fluid passes into the fluid chamber 32 that surrounds the cylindrical internal bore 18 of the valve body portion 12. Under pressure the fluid flows upwardly through the lower portion of chamber 32 in the inlet end portion 20 and is directed through the elliptically shaped fluid channel portions 34 and 36 to the upper portion of the chamber 32 positioned above the cylindrical cap 62 below the valve member 44.

From the upper portion of the chamber 32 below the valve member 44, the fluid is directed through a constricted passage 104 that leads to the passageway 76 in the valve body for directing the fluid into the inlet of the solenoid valve 78. The passage 104 is formed by an annular shoulder 106 on the lower end portion of the valve top 28 and the opposing surface of the valve body portion 12 surrounding the passageway 76. The passage 104 has a dimension selected to obstruct the flow of particles in suspension in the fluid into the passageway 76. In this respect, passage 104 serves as a filter to prevent the passage of particles having a cross sectional area greater than the opening through the passage 104 from entering the passageway 76.

Preferably the cross sectional area of the passage 104 is less than the cross sectional area of the passageway 76. Consequently, the downwardly projecting annular shoulder 106 provides a partial closure of the passage 76. Particles of a size corresponding to the cross sectional area of passage 76 do not enter the passage 76. They are obstructed by the downwardly projecting shoulder 106.

The fluid in passageway 76 is directed into the inlet of the solenoid valve 78. The solenoid valve 78 is electrically operated and is normally maintained in a closed position. From a remote location electrical signals are transmitted through the conductors 96 and 98 to open the valve 78 to allow fluid to flow from the passageway 76 through the valve 78 and into the passageway 80 that opens into the fluid cavity 74 above the piston 58.

The structure of the solenoid valve 78 is beyond the scope of the present invention and, therefore, will not be described in detail herein. A commercially available solenoid valve suitable for use as valve 78 in the present invention is made and sold by Snap-Tite Inc., Erie, Pa. under model no. 2W131-9DB-A0D1.

While the solenoid valve 78 is opened, the solenoid valve 82 on the opposite side of fluid cavity 74 is maintained closed. Consequently, the cavity 74 is pressurized with fluid that is diverted from the internal axial flow in the valve 10. All the fluid for pressurizing the cavity 74 is supplied from the internal flow into the valve inlet port 24. No other source of fluid is required to pressurize cavity 74.

When the fluid pressure within cavity 74 reaches a selected magnitude, the spring bias exerted upon piston 58 is overcome. The piston 58 is displaced downwardly in the bore 18 compressing the spring 60 between the enlarged end portion of the piston 58 and the lower surface of the valve body 12 in the bore 18. Downward movement of the piston 58 moves the valve stem 50 downwardly through the fixed cylinder cap 62 to move the valve member 44 downwardly out of sealing engagement with the valve seat 38. Displacing the valve member 44 from the valve seat 38 opens the fluid path from the valve seat 38 to the outlet port 26. From the outlet port 26, the pressurized fluid flow is directed to a suitable conduit system connected to the outlet end portion 22.

In the closed position of valve 10, electrical signals supplied to conductors 96 and 98 automatically open the solenoid valve 78 and close the solenoid valve 82. In addition the outlet port 26 is maintained pressurized by closure of the relief valve 48. In the presence of fluid pressure above a minimum magnitude the relief valve 48 is maintained closed.

The relief valve 48 may be selected from any number of valve configurations. One example is the poppet valve 48 shown in FIGS. 1 and 5. The poppet valve 48 is normally maintained in an open position in the absence of fluid flow above a preselected pressure through the outlet port 26.

The poppet valve 48 includes a cylindrical valve body 108 having an externally threaded end portion 110 threaded into the relief port 46 to secure the poppet valve body 108 to the valve body portion 12. An axial passageway 112 extends from the end portion 110 to outlet 114. A valve member 116 is supported for longitudinal reciprocal movement within the passageway 112 between an open position removed from sealing engagement with a valve seat 118, as shown in FIG. 1, to a closed position engaging the valve seat 118, as shown in FIG. 5.

In the absence of fluid pressure in the outlet port 26, compression spring 120 of poppet valve 48 exerts an axial force upon stem 122 of valve member 116 to displace the valve member 116 from engagement with the valve seat 118. With the valve member 116 removed from sealing engagement with the valve seat 118, fluid is permitted to pass through the relief port 46 into the valve end portion 110.

The fluid is directed through a plurality of channels 124 that extend longitudinally on the exterior surface of valve stem 122. The channels 124 are radially spaced apart on stem 122. The channels 124 communicate with the fluid passageway 112. From passageway 112, the fluid passes through outlet 114 to a suitable conduit system.

The poppet valve 48 in the absence of fluid pressure above a selected magnitude in the valve outlet port 26 automatically opens to the position shown in FIG. 1. For example, should the fluid pressure in outlet port 26 fall below 300 psi, the spring 112 moves the valve member 116 off of the valve seat 118. Any fluid remaining in the fluid chamber 32 at the valve outlet end portion 22 is exhausted through the relief port 46 and the poppet valve 48. In this manner all of the fluid retained in the outlet end portion 22 is exhausted.

To close the valve 10, electrical signals to conductors 96 and 98 are interrupted to close the valve 78 and electrical signals are supplied to conductors 100 and 102 to open the solenoid valve 82. As a result, fluid within the fluid cavity 74 acting against the spring biased piston 58 is exhausted through passageway 84 and the valve 82 to the drain pipe 86 and therefrom to a conduit system connected to end 94 of pipe 86. In this manner, all fluid in the passageways 76 and 80, cavity 74 and passageway 84 is exhausted. A commercially available valve for use as solenoid valve 82 is also made and sold by Snap-Tite Inc. under model no. 2W141-9DB-A0E1.

The compression spring 60 then displaces the piston 58 upwardly to move the valve member 44 into sealing engagement with the valve seat 38. With the valve closed, the remaining fluid below the valve member 44 in fluid chamber 32 is evacuated by gravity flow downwardly through the valve body 12 to the inlet port 24 and the conduit system connected thereto. Thus in the closed position of the valve 10, as shown in FIG. 1, all fluid in the valve is exhausted. No fluid remains in the valve 10 when the valve 10 is closed. This prevents any fluid being retained in the valve 10 and freezing to inhibit operation of the valve 10 when used with snowmaking equipment. It also serves to remove any toxic chemicals from the valve 10 when used in a chemical process.

The operation of the valve 10 is not limited to the use of the solenoid valves 78 and 82. Other types of flow responsive valves can be utilized. The solenoid valves 78 and 82 are particularly adaptable in flow control where remote operation of the valve 10 is desired. This is encountered when the valve 10 is used to supply water to snowmaking equipment or in a chemical process. The valve 10 of the present invention is particularly adaptable in a chlorination system where chlorine must be selectively added to water or in any other type of chemical process where an additive is selectively supplied to a fluid system.

A flow responsive valve for use with the present invention as a substitute for the solenoid operated valves 78 and 82 is a conventional ball valve (not shown). In this embodiment of the present invention, a pair of ball valves are connected in fluid communication with the respective passageways 76, 80 and 84. An inlet ball valve is connected to the valve body 12 in fluid communication with the passageway 76 from fluid chamber 32 and passageway 80 open to the fluid cavity 74.

In response to fluid pressure exceeding a selected magnitude in the chamber 32, the inlet ball valve is moved from a normally closed position to an open position. The outlet ball valve connected to the valve body 12 and communicating with the passageway 84 is normally open in the absence of fluid above a preselected pressure in chamber 32. When the inlet ball valve opens, the outlet ball valve automatically closes. This allows the fluid pressure in cavity 74 to build and displace the piston 58 against the force of the spring 60 to move the valve member 44 off of the valve seat 38. When flow to the valve inlet port 24 is interrupted or falls below a preselected magnitude, the inlet ball valve communicating with chamber 32 closes. The outlet ball valve communicating with cavity 74 opens to exhaust fluid from the valve.

In the embodiment of the present invention using the solenoid operated valves 78 and 82, the valve 10 is shown in the open position in FIGS. 5 and 6. While the valve 10 can be operated in either one of the two positions, i.e. the closed position or the fully open position, it is also used in a proportional manner. In a proportional manner the valve member 44 cycles into and out of engagement with the valve seat 38 by rapidly switching the solenoid valves 78 and 82 on and off. A pulsing movement of the valve member 44 into and out of sealing engagement with the valve seat 38 is generated. This limits the fluid flow from the inlet port 24 to the outlet port 26. It also allows incremental or partial flow in comparison with the continuous flow that is achieved when the valve is maintained in the open position, as illustrated in FIG. 5. With this arrangement, the relative position of the valve member 44 with respect to the valve seat 38 is controlled to limit the flow through the valve member 44 to the outlet port 26.

With the present invention, the valve 10 is operated from the closed position shown in FIG. 1 to the fully opened position shown in FIG. 5. A pulsing action of the valve member 44 into and out of engagement with the valve seat 38 is also available. Regardless the method of use of the valve 10, no secondary external flow into the valve 10 is required to initiate movement of the valve member 44. The valve 10 is actuated by the axial flow into the inlet port 24.

When fluid flow to the inlet port 24 is terminated or falls below a set pressure level, the valve 10 automatically closes. The fluid retained in the fluid chamber 32 above the closed valve member 44 is exhausted through the relief port 46 and the relief valve 48. The fluid remaining in the chamber 32 below the closed valve member 44 is exhausted through the inlet port 24. The fluid retained in the cavity 74 above the piston 58 is also evacuated from the valve body 12 through the drain pipe 86. This assures that no fluid is retained in the valve 10 which could interfere with subsequent operation of the valve.

According to the provisions of the patent statutes, we have explained the principle, preferred construction, and mode of operation of our invention and have illustrated and described what we now consider to represent its best embodiments. However, it should be understood that, within the scope of the appended claims, the invention may be practiced otherwise than as specifically illustrated and described.

We claim:

1. A flow actuated valve comprising:

a valve body, said valve body having an inlet end portion with an inlet port and an outlet end portion with an outlet port, said inlet port axially aligned with said outlet port, a fluid chamber in said valve body forming a flow path for conveying fluid from said inlet port to said outlet port, a relief port extending through said valve body into said valve chamber adjacent to said outlet port, a valve seat positioned in said fluid chamber in axial alignment with said inlet and outlet ports, said valve seat located in said fluid chamber between said inlet port and said relief port, a valve member positioned in said fluid chamber for movement into and out of sealing engagement with said valve seat to control the flow of fluid between said inlet and outlet ports, a valve piston positioned axially in said valve body in spaced relation to said valve member, a valve stem connected at one end to said valve member and at an opposite end to said valve piston, a spring retained in said valve body to exert an axial biasing force upon said valve piston to normally maintain said valve member in a closed position sealingly engaging said valve seat to obstruct fluid flow from said inlet port to said outlet port, a passageway extending internally through said valve body for diverting a portion of the fluid flow into said inlet port from said fluid chamber into contact with said valve piston to overcome the biasing force of said spring to displace said valve piston and move said valve member to an open position to allow fluid flow through said valve chamber from said inlet port to said outlet port, said valve member being moved to the open position in response to fluid flow into said inlet port, and said valve member automatically moving to the closed position under the force of said spring upon termination of fluid flow into said inlet port with the fluid remaining in said fluid chamber between said valve member and said inlet end portion exhausted through said inlet port and the fluid remaining in said fluid chamber between said valve member and said outlet end portion exhausted through said relief port whereby all fluid in said fluid chamber is exhausted upon closure of said valve member.

2. A flow actuated valve as set forth in claim 1 including:

a relief valve positioned in said fluid chamber between said outlet port and said relief port for exhausting fluid from said fluid chamber.

3. A flow actuated valve as set forth in claim 1 including:

a first solenoid operated valve and a second solenoid operated valve, a valve cap, and said first solenoid operated valve communicating with said valve cap through a first passageway in said valve body, and said second solenoid operated valve communicating with said valve cap through a second passageway in said valve body.

4. A flow actuated valve as set forth in claim 3 including:

a drain pipe communicating with said second solenoid operated valve to convey fluid out of said fluid chamber.

5. A flow actuated valve as set forth in claim 3 wherein:

said valve body includes a cylindrical body portion and an end portion, and said end portion being releasably connected to said body portion for assembly and disassembly of said valve body.

6. A flow actuated valve as set forth in claim 3 wherein:

said valve body outlet end portion includes a shoulder portion, said valve body including a third passageway communicating with said first passageway, and said third passageway positioned oppositely of said shoulder portion forming a constricted passageway leading to an opening in said third passageway.

7. A flow actuated valve as set forth in claim 6 wherein:

said constricted passageway has a cross sectional area less than a cross sectional of said third passageway.

8. A flow actuated valve as set forth in claim 7 including:

a pair of conductors connected to said solenoid valve, and said solenoid valve being remotely activated through said conductors.

9. A flow actuated valve as set forth in claim 8 including:

a relief valve connected to said relief port for exhausting fluid from said fluid chamber through said relief port.

10. A flow actuated valve as set forth in claim 9 wherein:

said relief valve includes a poppet valve.

11. A hydrant valve comprising:

a cylindrical body portion positioned upright to define a vertical flow path through a fluid chamber between an inlet port and an outlet port and aligned with a longitudinal axis of said body portion, a relief port extending through said valve body into said valve chamber adjacent to said outlet port, a valve seat formed by said body portion in said flow path positioned adjacent to and axially aligned with said outlet port, a valve member axially positioned in the flow path, actuator means positioned in said body portion for moving said valve member between a closed position sealingly engaging said valve seat and an open position removed from said valve seat for conveying fluid under pressure from said inlet port to said outlet port, said valve member movable to the open position in response to axial flow into said inlet port and movable to the closed position in response to termination of flow to said inlet port, and said valve member in said closed position diverting fluid in said fluid chamber on one side of said valve member out said inlet port and fluid in said valve chamber on an opposite side of said valve member out said relief port to exhaust all fluid from said fluid chamber upon closure of said valve member.

12. A hydrant valve as set forth in claim 11 which includes:

a relief valve positioned in said fluid chamber between said outlet port and said relief port for exhausting fluid from said fluid chamber through said relief port.

13. A hydrant valve as set forth in claim 12 wherein:

said relief valve includes a poppet valve for exhausting fluid from said fluid chamber through said relief port.

14. A hydrant valve as set forth in claim 11 in which:

said actuator means includes a pair of activated valves for pressurizing said valve chamber with fluid to move said valve member between said open and closed positions.

15. A hydrant valve as set forth in claim 14 wherein:

said activated valves include solenoid activated valves.

16. A hydrant valve as set forth in claim 14 which includes:

a poppet valve positioned in said relief port for exhausting fluid from said fluid chamber through said relief port.

17. A method for actuating a valve by fluid flow into the valve comprising the steps of:

directing fluid under pressure in a flow path axially through a valve body from an inlet port to an outlet port, positioning a valve member in the valve body for axial reciprocal movement in the flow path into and out of sealing engagement with a valve seat, normally biasing the valve member in sealing engagement with the valve seat in the absence of fluid flow to the inlet port to maintain the valve closed, actuating the valve member to move to an open position on the valve seat in response to fluid flow to the inlet port, diverting a portion of the fluid within the valve body from the flow path to oppose the normal bias on the valve member and move the valve member out of sealing engagement with the valve seat to open the valve for fluid flow to the outlet port, returning the valve member to sealing engagement with the valve seat upon an interruption in the fluid flow to the inlet port to close the valve, and exhausting all fluid in the flow path from the valve body upon closure of the valve member by directing the fluid on one side of the valve seat out the inlet port and the fluid on an opposite side of the valve seat out a relief port.

18. A method as set forth in claim 17 which includes:

directing fluid from one end of a valve chamber in the valve body into a solenoid valve, and actuating the solenoid valve to direct fluid into the valve body to pressurize the valve chamber with fluid and open the valve.

19. A method as set forth in claim 18 which includes:

directing fluid from the valve body through a constricted opening to the solenoid valve to activate the solenoid valve to move the valve member out of sealing engagement with the valve seat to open the valve.

20. A method as set forth in claim 18 which includes, rapidly actuating the solenoid valve between on and off positions to generate a pulsing movement of the valve member into and out of sealing engagement with the valve seat.

* * * * *